(12) United States Patent
Dodds et al.

(10) Patent No.: US 11,945,069 B2
(45) Date of Patent: Apr. 2, 2024

(54) TURBINE MOTOR SPINDLE ASSEMBLY FOR LIVE TOOLING AND MULTITASKING MACHINES

(71) Applicant: First Eastern Equities Ltd, Boca Raton, FL (US)

(72) Inventors: Kemma Samuel Dodds, North Lauderdale, FL (US); David William Tripp, Deerfield Beach, FL (US); Ronald Maharaj, N. Lauderdale, FL (US)

(73) Assignee: Air Turbine Technology, Inc., Boca Raton, FL (US)

( * ) Notice: Subject to any disclaimer, the term of this patent is extended or adjusted under 35 U.S.C. 154(b) by 68 days.

(21) Appl. No.: 17/551,985

(22) Filed: Dec. 15, 2021

(65) Prior Publication Data

US 2022/0184761 A1  Jun. 16, 2022

Related U.S. Application Data

(60) Provisional application No. 63/125,600, filed on Dec. 15, 2020.

(51) Int. Cl.
*B23Q 5/06* (2006.01)
*F01D 15/06* (2006.01)

(52) U.S. Cl.
CPC .............. *B23Q 5/06* (2013.01); *F01D 15/062* (2013.01); *F01D 15/065* (2013.01); *F01D 15/067* (2013.01)

(58) Field of Classification Search
CPC ........ B23Q 5/06; F01D 15/062; F01D 15/067
See application file for complete search history.

(56) References Cited

U.S. PATENT DOCUMENTS 3,088,707 A * 5/1963 Williams ............ F16C 32/0696
433/80
3,408,043 A * 10/1968 Williams .............. F01D 15/067
415/113

(Continued)

FOREIGN PATENT DOCUMENTS

FR  2662104 A1  11/1991
KR  101713839  *  3/2017

(Continued)

OTHER PUBLICATIONS

English Machine Translation of KR101713839B1, translated via USPTO Fit Datebase on Apr. 17, 2023 (Year: 2017).*

(Continued)

*Primary Examiner* — Dominick L Plakkoottam
*Assistant Examiner* — Paul W Thiede
(74) *Attorney, Agent, or Firm* — Fleit Intellectual Property Law; Jon Gibbons

(57) ABSTRACT

A novel turbine motor spindle assembly for a spindle-mounted pneumatic tool, especially in a live tool environment is described. The novel turbine motor spindle assembly includes a manifold with a front end and a rear end. The manifold includes an air intake passage for receiving pressurized air. The pressurized air is directed axially through a drive shaft rotatably coupled to the front end. The pressurized air drives a turbine motor assembly and a drive shaft. The drive shaft is mounted inside a housing is self-lubricating. The turbine motor assembly includes tangential openings for expelling exhaust air therefrom. The turbine motor housing is mechanically coupled to the front end of the manifold with an exhaust air passage for directing exhaust air from the one or more tangential openings out through the rear end of the manifold.

19 Claims, 12 Drawing Sheets

(56) References Cited

U.S. PATENT DOCUMENTS

| | | | |
|---|---|---|---|
| 4,378,195 A | 3/1983 | Gamell | |
| 7,077,732 B2 | 7/2006 | Dodds | |
| 7,223,069 B2 | 5/2007 | Dodds | |
| 2005/0064803 A1 | 3/2005 | Dodds | |
| 2009/0274992 A1 | 11/2009 | Klm | |
| 2009/0279975 A1* | 11/2009 | Tada | B23B 31/265 409/233 |
| 2013/0190153 A1* | 7/2013 | Dodds | B23Q 1/0036 483/31 |
| 2015/0075833 A1* | 3/2015 | Dotan | B23Q 5/06 173/218 |
| 2015/0209925 A1* | 7/2015 | Dodds | B23Q 1/0018 483/18 |
| 2021/0069842 A1* | 3/2021 | Dodds | B23Q 3/15706 |

FOREIGN PATENT DOCUMENTS

| | | | | |
|---|---|---|---|---|
| KR | 20180016778 A | * | 3/2018 | |
| WO | WO-2016042539 A1 | * | 3/2016 | ......... B23Q 11/1015 |

OTHER PUBLICATIONS

Headquarters Factory, "Nakanishi Spindle iSPEED3", www.nakanishi-inc.com Feb. 11, 2019.

International Search Report, PCT/US2021/063548, dated Jan. 31, 2022.

Written Opinion, PCT/US2021/063548, dated Jan. 31, 2022.

\* cited by examiner

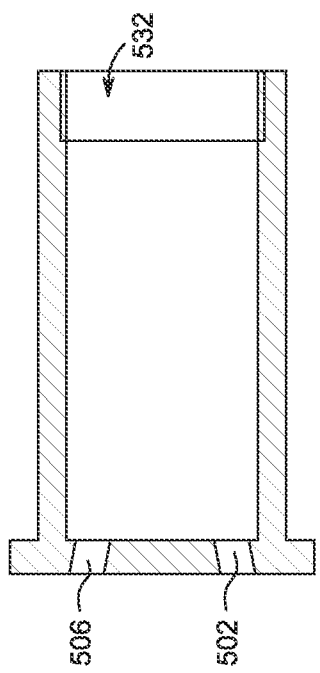
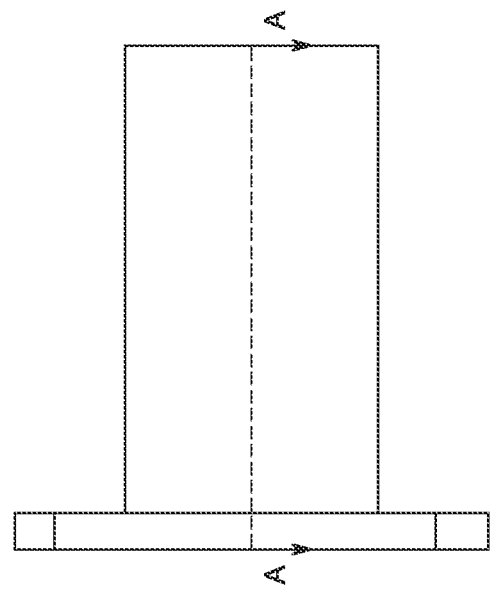
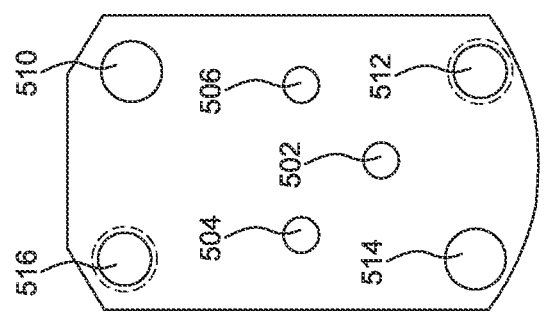

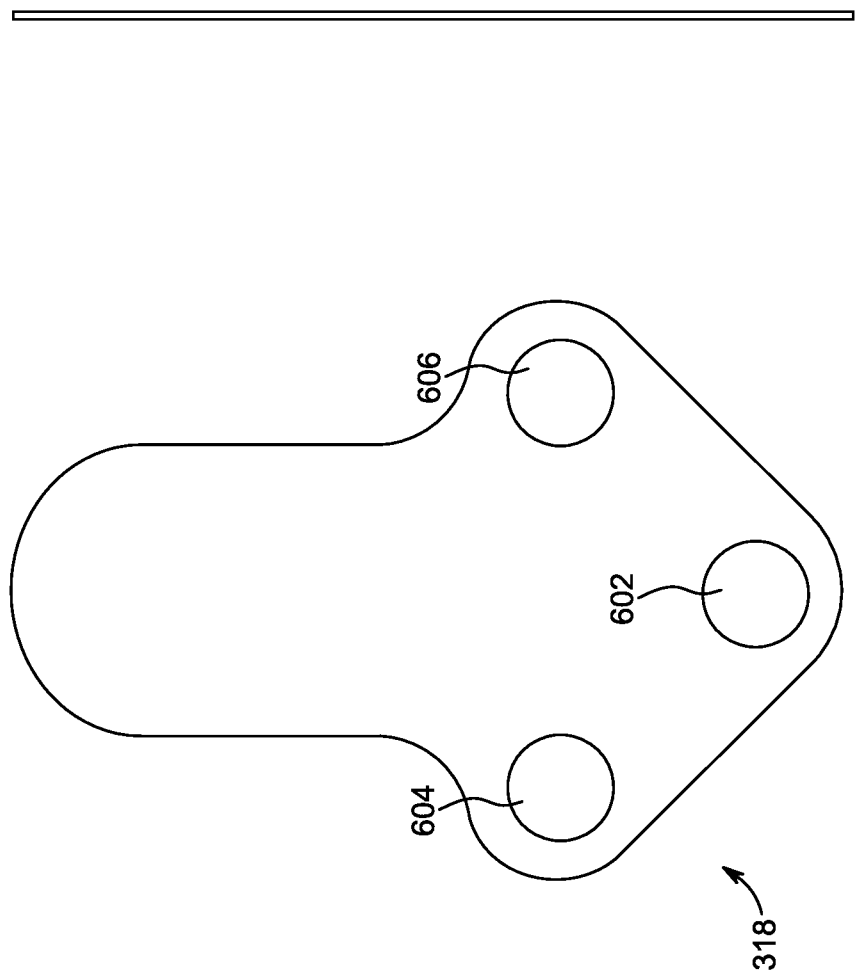

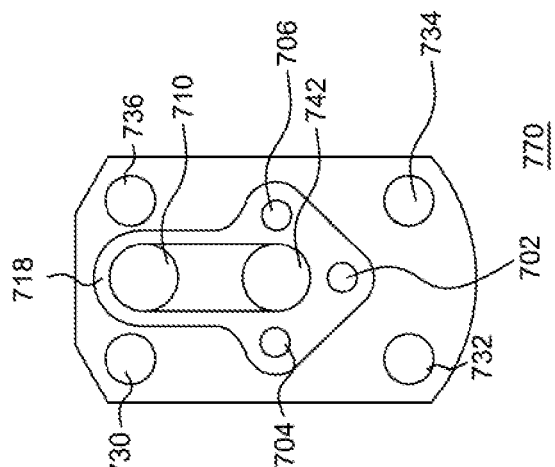
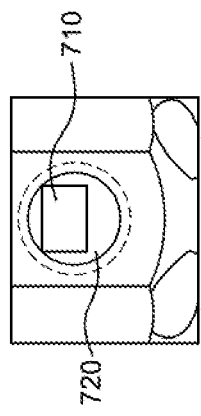
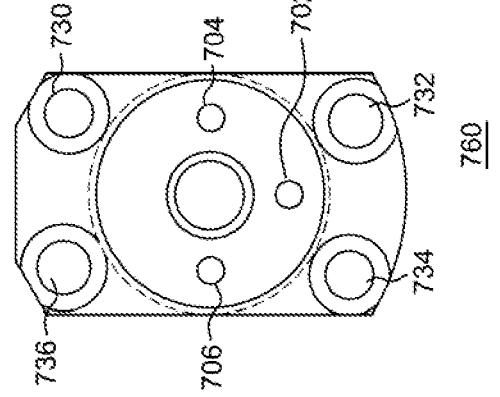
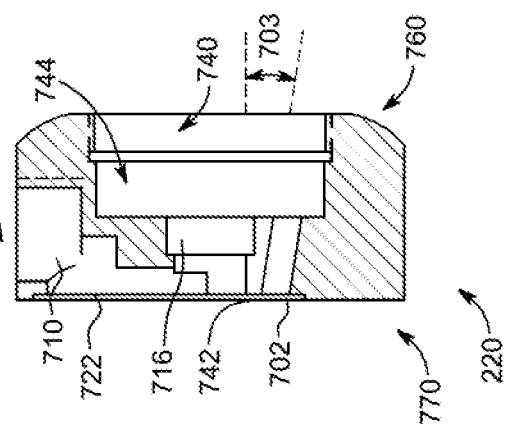

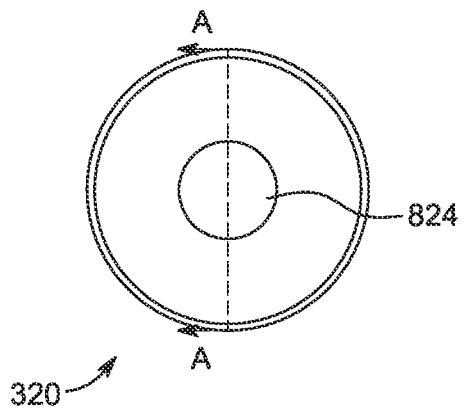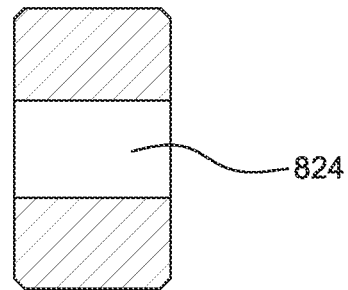
FIG. 8A  FIG. 8B
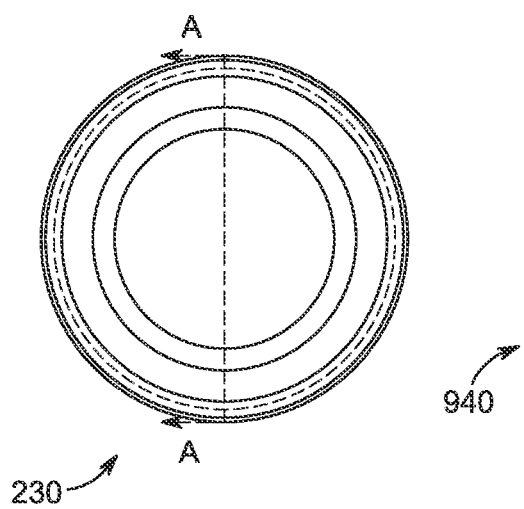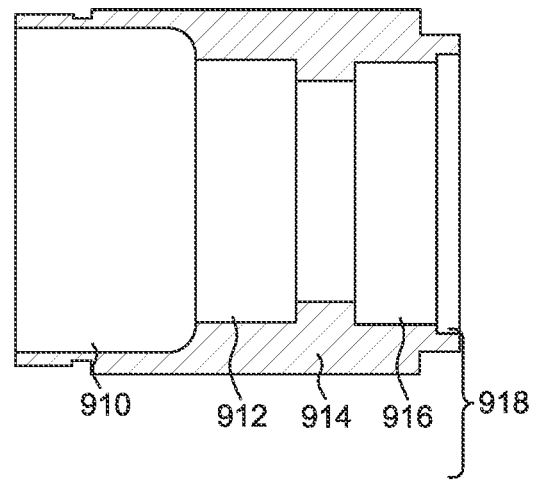
FIG. 9A  FIG. 9B

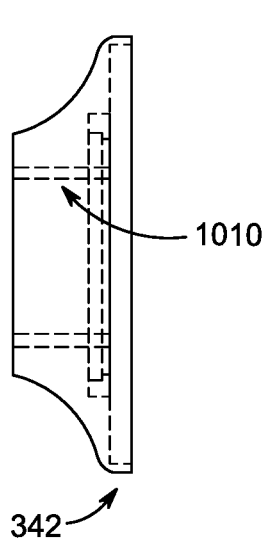
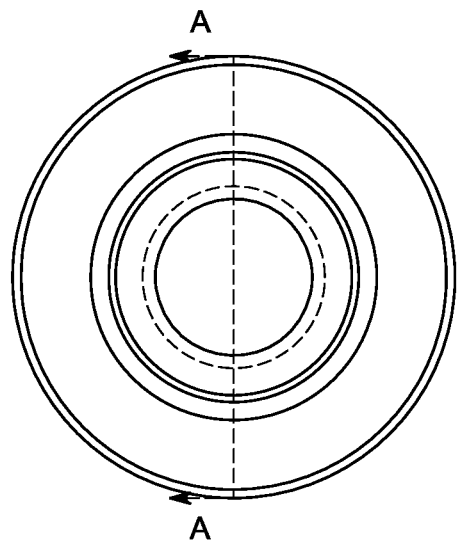
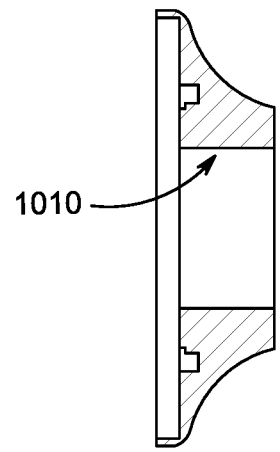
FIG. 10A  FIG. 10B  FIG. 10C
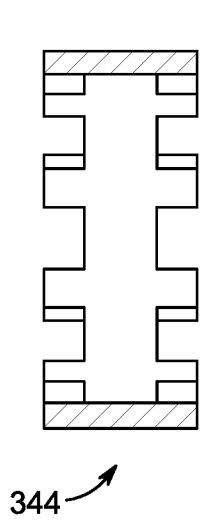
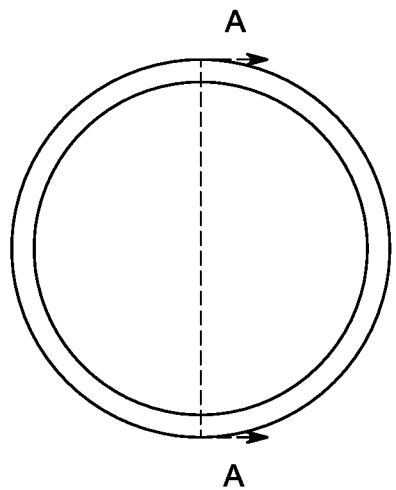
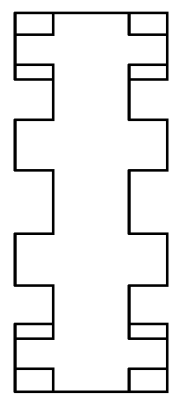
FIG. 11A  FIG. 11B  FIG. 11C

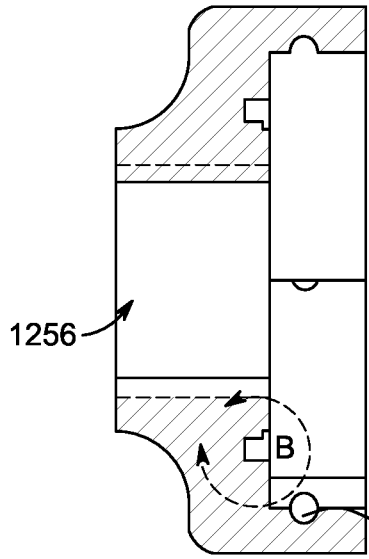
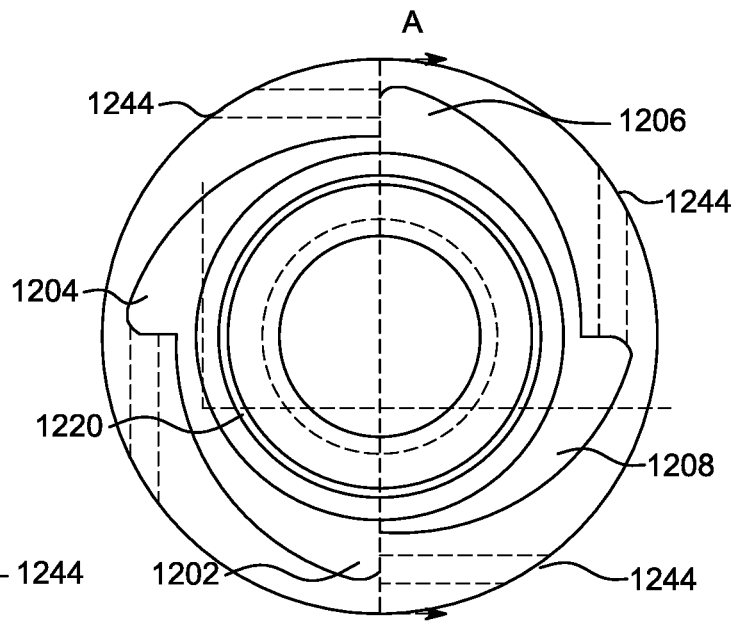
FIG. 12A  FIG. 12B
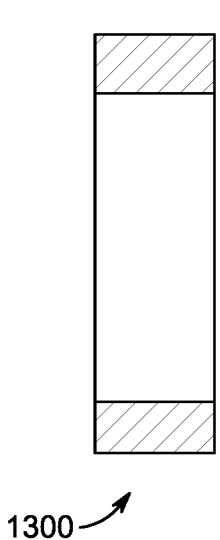
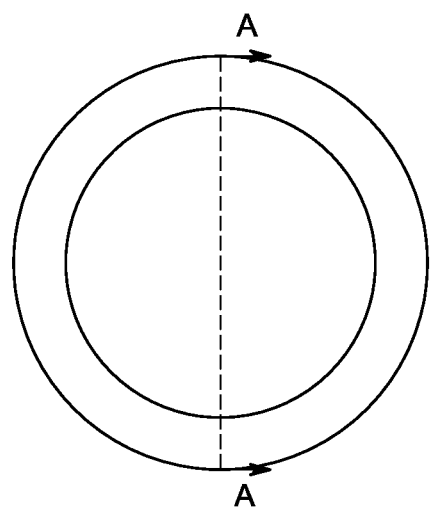
FIG. 13A  FIG. 13B

TURBINE MOTOR SPINDLE ASSEMBLY FOR LIVE TOOLING AND MULTITASKING MACHINES

CROSS-REFERENCE TO RELATED APPLICATIONS

This application is related to and claims priority to U.S. Provisional Patent Application No. 63/125,600, entitled "Turbine Motor For Live Tooling Machines," filed on Dec. 15, 2021, which is assigned to the same assignee as this application and the teachings of which are herein incorporated by reference in its entirety.

FIELD OF THE INVENTION

This disclosure generally relates to pneumatically powered, handheld, or spindle-mounted BMT (Base mounted tool) suitable for milling, drilling, grinding, polishing, and, more particularly, to a turbine motor for use with live tooling machines.

BACKGROUND

In the prior art, rotary tools have been used for a variety of functions, such as grinding, polishing, metal or plastic finishing, engraving, milling, drilling, and deburring. The tool variations include handheld and machine spindle-mounted embodiments.

Although the torque provided in current turbine motors is adequate for grinding and polishing tools that are lightweight and compact, higher torque in some applications of grinding and polishing is desirable.

The integration of milling into turning environments, and vice versa, began with "live tooling" for lathes and the occasional use of mills for turning operations. This integration led to a new class of machine tools, multitasking machines (MTMs), which are purpose-built to facilitate milling and turning within the same work envelope. For example, Gang tooling is an alternative to a turret tool lathe but is used primarily for small parts, short parts that do not need a tailstock because of the compactness of the machine's setup.

Live tooling is the opposite of static tooling. A normal lathe has static tools because the workpiece rotates, not the tools. In contrast, in live tooling, the tool is rotating. "Live Tooling," as the name implies, is typically driven by the Computer Numeric Control (CNC) control and the turret or gang tooling of various spindle and powered sub-spindle configurations on CNC lathes to perform various operations while the workpiece remains in orientation to the main spindle. These devices include Swiss machines that use BMT (Base Mount Tools). BMT's are not only live tools; they are tool holders that can hold both live tools and static tools. BMT is also called live or driven tools, as opposed to the static tools used during turning operations. Live tools are usually customized for the particular machine tool builder's turret assembly.

SUMMARY

Disclosed is a novel turbine motor spindle assembly for a spindle-mounted pneumatic tool, especially in a live tool environment. The novel turbine motor spindle assembly includes a manifold with a front end and a rear end. The manifold includes an air intake passage for receiving pressurized air. The pressurized air is directed axially through a drive shaft rotatably coupled to the front end. The pressurized air drives a high-torque turbine motor assembly and a drive shaft. The driveshaft is mounted inside a housing with self-lubricating. The turbine motor assembly includes tangential openings for expelling exhaust air therefrom. The turbine motor housing is mechanically coupled to the front end of the manifold with an exhaust air passage for directing exhaust air from one or more tangential of high-torque turbine motor assembly openings out through the rear end of the manifold.

The turbine motor spindle assembly may include a separate shank with a front end and a read end. The front end of the shank is attached to the rear end of the manifold. The rear end of the shank includes exhaust passages for directing air from the rear end of the manifold out the rear end of the shank.

To meet live tooling requirements, in one example, a combined length of the manifold and the turbine motor housing, when assembled together, is no more than 2 inches.

The novel turbine motor spindle assembly includes a drive shaft with a first end and a second end, and an outer wall, the first end including an axial bore and a set of openings in the outer wall at a position from the first end, the axial bore in fluid communications with the set of openings, the drive shaft including at least one bearing surface which mates with a first inner ring of a first drive shaft bearing and a second inner ring of a second drive shaft bearing.

The turbine motor assembly includes a turbine motor housing with a first axial end and a second axial end, at least three internal bores formed along an axial direction between the first axial end to the second axial end. The turbine motor housing includes a first internal bore of a first diameter for accepting a first outer ring of the first drive shaft bearing and a second internal bore of a second diameter for accepting a second outer ring of the second drive shaft bearing, and a third internal bore of a third diameter for accepting a turbine motor assembly there into, the turbine motor assembly with at least one turbine in fluid communication with the set of openings of the drive shaft and the turbine motor assembly including one or more tangential openings for expelling air from the at least one turbine. In one example, the first internal bore of the first diameter and the second internal bore of the second diameter are identical. In another example, the third diameter is larger than the first diameter and the second diameter.

The turbine motor spindle assembly includes a manifold with a second end for coupling with the second axial end of the turbine motor housing and a first end for coupling with a shank. The manifold includes a fluid inlet in fluid communications with an axial bore of the drive shaft to drive the turbine motor assembly and at least one axial opening in fluid communication with one or more tangential openings of the turbine motor assembly for air being expelled therefrom. One example, the second end of the manifold includes an internal bore of the third diameter for accepting a portion of the turbine motor assembly thereinto. It has been advantageous the at least one axial opening of the manifold is formed at an angle with respect to the drive shaft. In one example, the angle is approximately 5 and 15 degrees. In another example, the angle is approximately between 9 and 10 degrees. Still further in another example, the angle is between 9.5 and 10 degrees.

To meet live tooling requirements, in one example, a combined length of the manifold and the turbine motor housing, when assembled together, is no more than 1.76 inches.

BRIEF DESCRIPTION OF THE DRAWINGS

FIG. 5A is a front view of the shank of FIG. 3 with internal passages, FIG. 5B is a side view, and FIG. 5C is a cross-section view of FIG. 5B taken along A-A, in accordance with an illustrative embodiment of the present invention;

FIG. 6A is a front view of the gasket between the shank of FIG. 5A and manifold of FIG. 7A and FIG. 6B is a side view of the gasket, in accordance with an illustrative embodiment of the present invention;

FIG. 7A is a cross-section view of a manifold, FIG. 7B is a top view thereof, FIG. 7C is a front view thereof, and FIG. 7D is a rear view thereof, in accordance with an illustrative embodiment of the present invention;

FIG. 8A is a front view of a seal for sealing airflow into the drive shaft shown in FIG. 13 and FIG. 8B is a cross-section view of FIG. 8A taken along A-A', in accordance with an illustrative embodiment of the present invention;

FIG. 9A is a front view of turbine motor housing, and FIG. 9B is a cross-section view of FIG. 9A taken along A-A', in accordance with an illustrative embodiment of the present invention;

FIG. 10A is a side view of rotor cap, FIG. 10B is a front view thereof, and FIG. 10C is a cross-section view of FIG. 10B taken along A-A', in accordance with an illustrative embodiment of the present invention;

FIG. 11A is a cross-section view of the rotor governor ring of FIG. 11B has taken along A-A' and FIG. 11B is a front view thereof, and FIG. 11C another side view thereof, in accordance with an illustrative embodiment of the present invention;

FIG. 12A is a cross-section view of the rotor base of FIG. 12B has taken along A-A' and FIG. 12B is a front view thereof, in accordance with an illustrative embodiment of the present invention;

FIG. 13A is a cross-section view of an O-ring of FIG. 13B, taken along A-A' and FIG. 13B is a front view thereof, in accordance with an illustrative embodiment of the present invention;

DETAILED DESCRIPTION OF THE INVENTION

Figure 1:
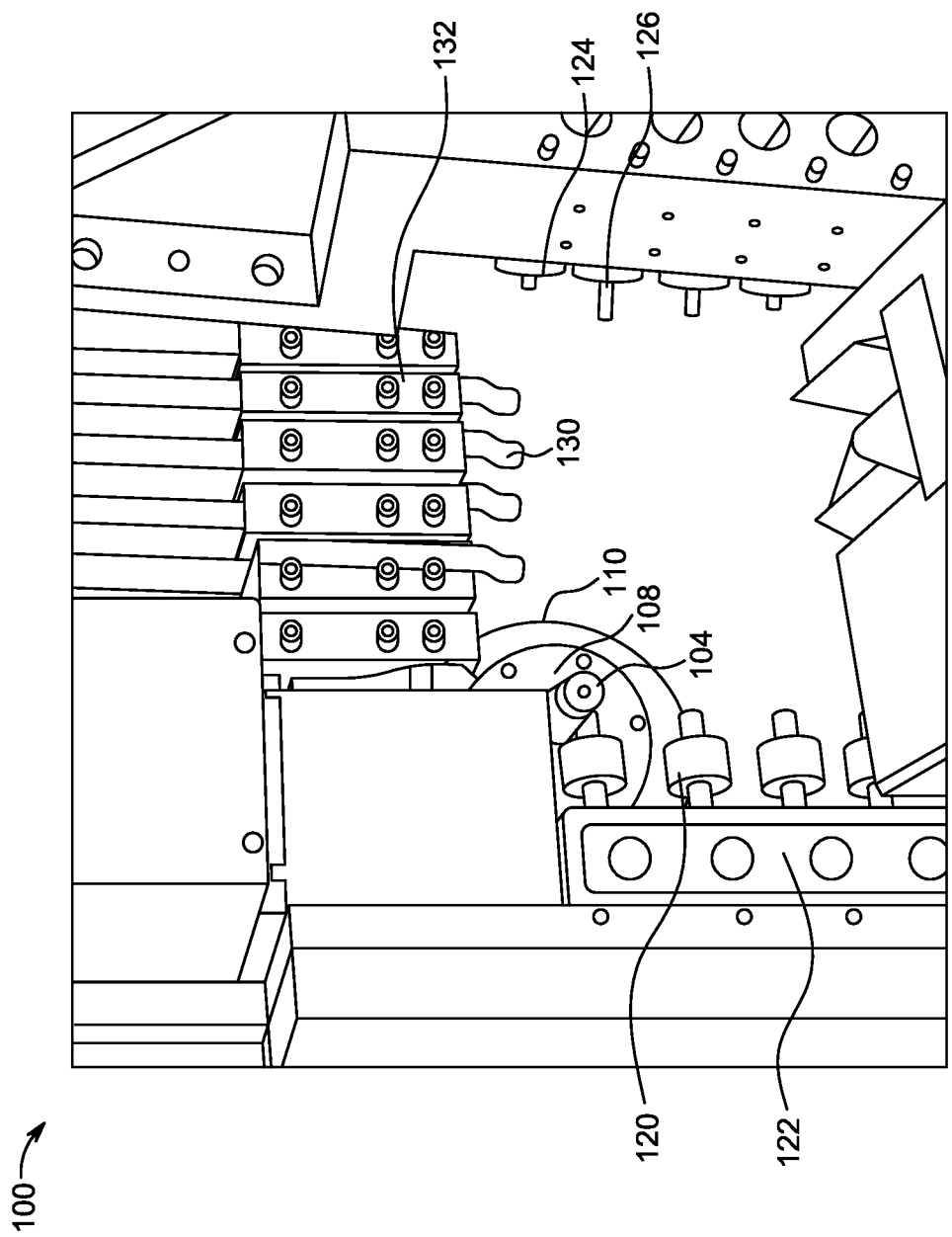
FIG. 1 is a perspective view of a turbine motor spindle assembly installed on a gang tool for a live tooling application, in accordance with an illustrative embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather, to provide an understandable description.

The present invention provides an air turbine motor spindle assembly for handheld or machine-mounted applications. The main difference between the air turbine motor spindle assembly live tooling rotor and other commercially available motors is that the air turbine motor spindle assembly has a governed turbine instead of a drum-style rotor. A governed turbine gives the pneumatic tool far superior power than the alternative. The main similarity of the present invention is the external dimensions and visual appearance. The turbine motor spindle assembly has a shank bolt-hole pattern to fit within the holder of live tooling machines, including Swiss-style machines and BMT (Base Mount Tools).

Designing the front of the turbine motor spindle assembly was challenging because of strict length limitations. Unlike other commercially available rotor motors, which are one-piece, the shank and manifold of the present invention is a two-piece design. This two-piece design permits the mounting of the seal for the drive shaft as far to the rear as possible in a direction away from the collet nut. The manifold now includes a gasket to create an airtight seal with the shank. The manifold also has another set of threaded counterbores that accepts screws to secure with the shank. The manifold has a recessed contour milled into the rear to accommodate for the gasket thickness. The inventors discovered that the air inlet threaded bore could not be drilled straight through to connect the airflow to the seal pocket because the seal pocket is directly in the way. A cross-hole needed to be drilled at the bottom of the air inlet bore. Further, a slot needed to be milled to allow for airflow to be connected between the air inlet and the central bore. In this example, the exhaust holes are formed at an angle. In one embodiment, that angle is between 5 and 15 degrees with respect to the drive shaft. In this embodiment, the angle is approximately 9.65 degrees offset of the drive shaft axial centerline datum. The exhaust holes are formed to avoid cutting the opening on the manifold or the muffler pad bore on the shank and holes.

The rotor governor assembly used in the live tooling prototype of the present invention is a modified version of an existing Air Turbine rotor as described in U.S. Pat. No. 4,776,752 entitled "Speed Governed Rotary Device" (the '752 patent) and U.S. Pat. No. 7,077,732 entitled "High Torque, Dual Chamber Turbine Rotor for Handheld or Spindle Mounted Pneumatic Tool" (the '732 patent) the teachings of each patent are incorporated by reference in their entirety. Like the '752 patent but unlike the '732 patent in one embodiment, the present invention is a single governor to reduce length. The external dimensions are designed to work within a Swiss-style machine fitted with BMT and gang live tooling machine. Internally the governor ring and rotor grooves are designed to work with the closest stock O-ring possible. The rotor exhaust ports are a direct scaled down of the '732 patent.

Housing the governed turbine is one of the most important factors for reducing the length. The spacing of the bearing drives affects the overall length of the air turbine motor spindle assembly. In one example, the maximum spacing allowable bearing to bearing distance is approximately 0.137 inches. This extremely small spacing created challenges not only in the design but also in the assembly and alignment.

In one embodiment, the drive shaft and shaft end is made in one piece because the short length required does not allow for the drive shaft end to be formed as a separate piece. A two-piece design would make it easier to assemble but is not possible. The wrench flat is formed as far back from the collet nut as possible so that it will not interfere with the collet nut or deflector.

Non-Limiting Terminology

The terms "a" or "an," as used herein, are defined as one or more than one. The term plurality, as used herein, is defined as two or more than two. The term another, as used herein, is defined as at least a second or more.

The term "and" in the phrase "one of A, B, and C" means either A or B or C or any combination of A, B, and C.

The term "air" is intended to broadly cover many different types of fluids, including oil mixed with air.

The phrase "air intake passage" is the passageway in which compressed air is introduced into an air inlet that communicates with an axial opening in a drive shaft that drives the turbine rotor;

The term "coupled," as used herein, is defined as "connected" although not necessarily directly and not necessarily mechanically.

The phrase "exhaust air passage" is the passage from the turbine motor housing that expels air tangentially from the turbine rotor through to the end portion of the turbine motor spindle assembly which is opposite the collet nut.

The terms "including" and "having" as used herein are defined as comprising (i.e., open language).

Various materials or combinations of materials can be used to construct the mounting collar assembly and its components. For example, materials such as metals, alloys, composites, plastics, ceramics, and other inorganic or organic materials or combinations thereof may be used.

Live Tool Machining System

Referring to the drawings and in particular to FIG. 1 perspective view of turbine motor spindle assembly installed on a gang tool 100 for a live tooling application. Shown is a turbine motor spindle assembly 120 mounted in a live tool station 122 of the gang tool 100. The gang tool 100 includes a number of tool stations 120, 124, and 126 for receiving both live, i.e., turbine motors spindle assembly 120 and stationary or static tools 130 in a static tool station 132. The turbine motor spindle assembly 120 are described further below are the air-driven system for driving live tools. Movement of lathe 110 allows a desired one of the number of live tool 120 and static tools 130 mounted at the tool stations 122, 132 to be engaged for a machining operation on a workpiece 104 mounted in chuck 108 of lathe 110. The chuck 108 of lathe 110 is connected to the lathe's drive system (not shown) for driving (rotating) the workpiece 104 in a known manner. The lathe 110 is also movable relative to the live tool 120 and static tools 124, 130 in an X-axis, a Y-axis, and a Z-axis direction.

Overview Turbine Motor Spindle Assembly

Figure 2:
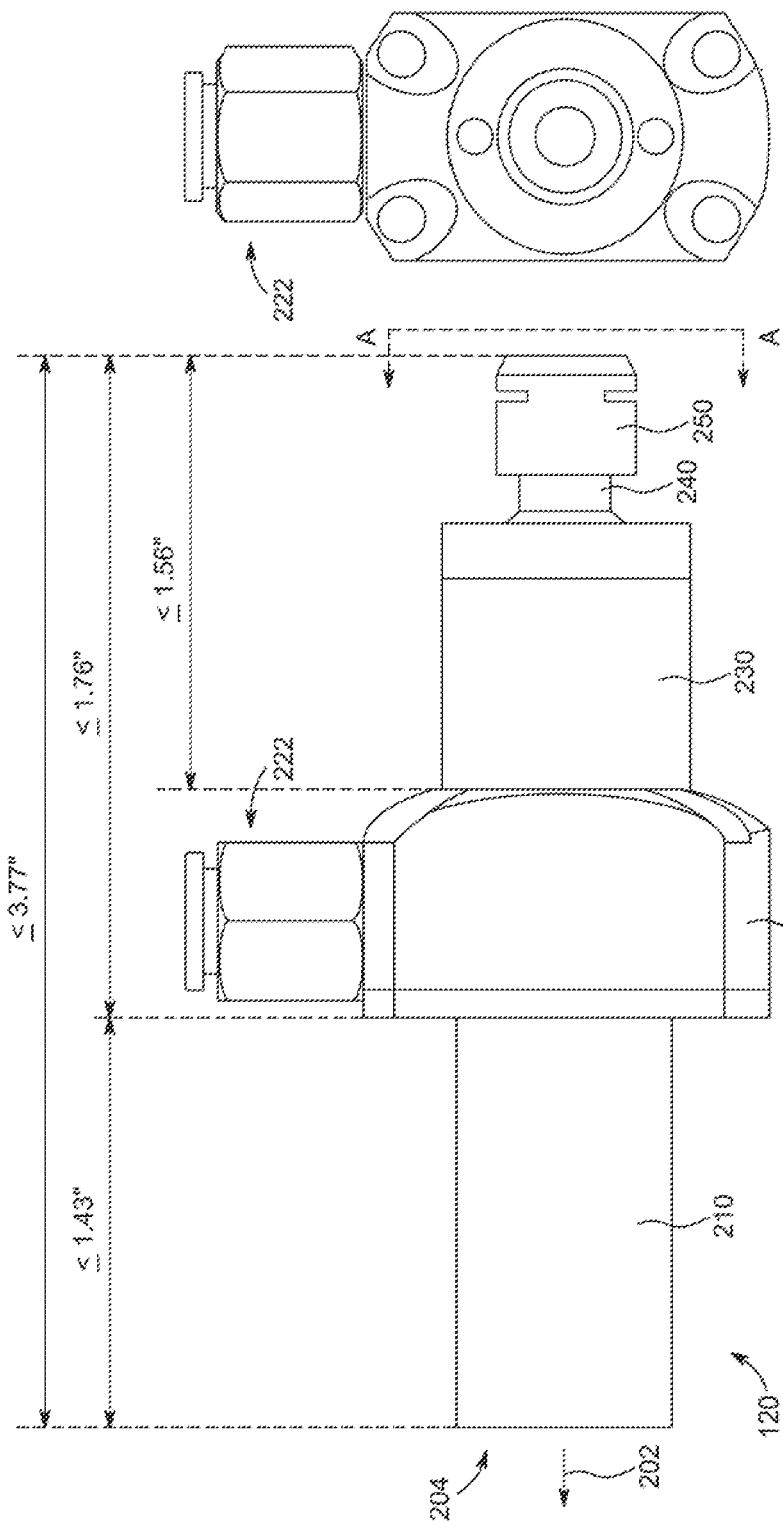
FIG. 2A is a side view of the turbine motor spindle assembly and FIG. 2B is a front view side end view thereof, in accordance with an illustrative embodiment of the present invention.

Referring now to the drawings, in particular, FIG. 2 through FIG. 13, the instant turbine motor spindle assembly used a live tool 120 is illustrated generally in FIG. 2. More specifically, FIG. 2A is a side view of the turbine motor spindle assembly 120 and FIG. 2B is the side view thereof on collet nut 250 end A-A as shown. Exhaust air 202 is expelled from the end or rear end (the end that is opposite the collet nut 250) 204 of shank 210 after passing through the turbine, as further described below. A manifold 220 is connected between the shank 210 and a turbine motor housing 230, as shown. An air inlet 222 for receiving pressurized fluid (not shown). Also shown is drive shaft 240 coupled to the turbine inside turbine motor housing 230 and to a collet nut 250. Note the dimensions as shown. The overall combined overall length of the manifold 220 with the turbine motor housing 230, drive shaft 240, and collet nut 250 is approximately 1.76 inches, as shown.

Figure 3:
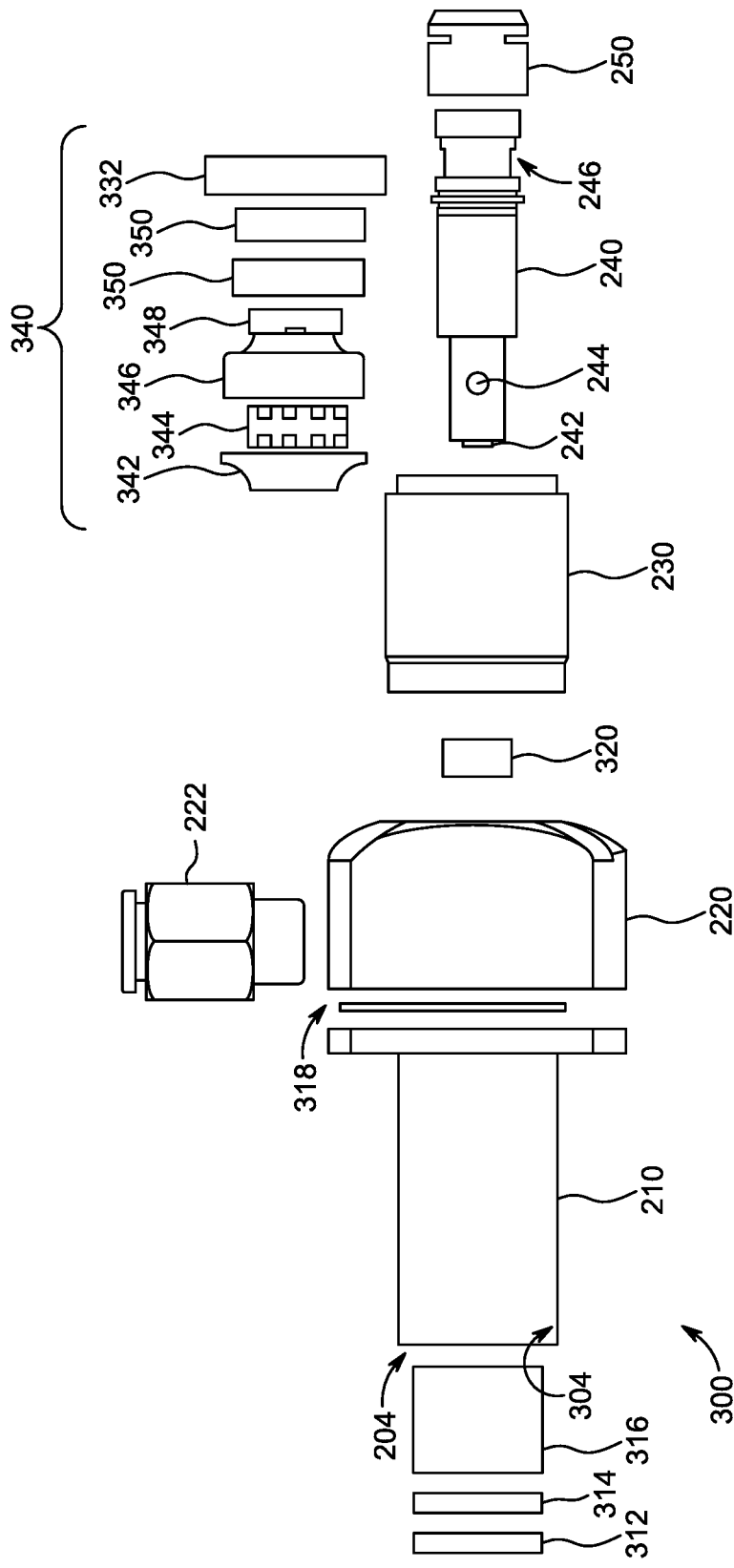
FIG. 3 is an exploded side view of the full live tool turbine motor spindle assembly of FIG. 2A, in accordance with an illustrative embodiment of the present invention.

FIG. 3 is an exploded side view of the turbine motor spindle assembly 300 of FIG. 2A. The shank 210 has internal components of muffler pad 316, muffler screen 314, and screen retaining nut or clip 312 that work cooperatively with threads 304 on the inside wall of shank 210 as shown in FIG. 5 to reduce the noise of the air exhaust. Disposed between the shank 210 and manifold 220 is a gasket 318. Details of the gasket 318 are shown in FIG. 6A and FIG. 6B as further described below. Also shown is a seal 320 for sealing the axial end of the driveshaft to the manifold. The drive shaft 240 has an axial opening 242 for receiving pressurized fluid (not shown), such as air, via inlet 222. The axial opening 242 of the drive shaft 240, as further described below, are in fluid communication with outer wall openings 244.

When assembled, the turbine motor housing 230 includes the drive shaft 240 with the high-torque turbine motor assembly 340. The high-torque turbine motor assembly 340 includes rotor cap 342, rotor governor ring 344, rotor base 346, O-ring (not shown), bearing lock nut 348 (see description for FIGS. 10-12 below), a set of bearings 350, and deflector 332. The basic operation of the rotor assembly inside the turbine motor housing 230 is described in the '732 patent and the '752 patent referenced above. Note that some of the rotor motor assembly components, specifically one of the two bearings 350, are assembled from one end of the turbine motor housing 230 closest to the collet nut 250 onto the drive shaft 240. The other components are assembled on the other end of the turbine motor housing 230 closest to the axial opening 242 of the drive shaft 240. The collet nut 250 rotatably couples onto end 246 of drive shaft 240 as shown.

Air Intake Passage and Exhaust Air Passage

Figure 4:
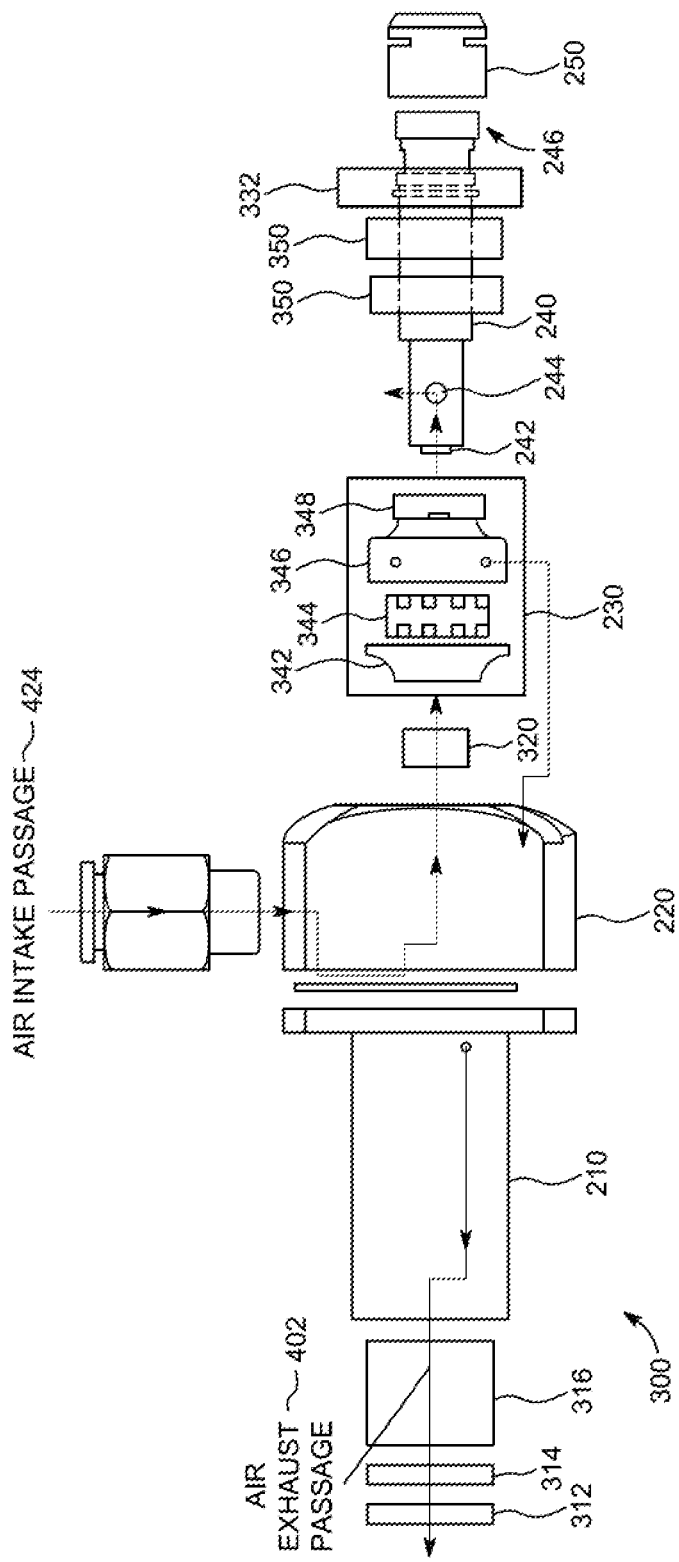
FIG. 4 is an exploded side view of the full live tool turbine motor spindle assembly of FIG. 2A illustrating the air intake passage and the air exhaust passage, in accordance with an illustrative embodiment of the present invention.

FIG. 4 is an exploded side view of the full live tool turbine motor spindle assembly of FIG. 2A illustrates the air intake passage 424 and the air exhaust passage 402, in accordance with an illustrative embodiment of the present invention. Note the turbine motor is driven by air traveling axially through drive shaft 240 that enters from the axial opening 242 through to an opening 244, as shown. The air exhaust passage directs the air leaving the turbine motor from tangential exhaust air passages (1244 shown in FIG. 12) back out the rear portion 204 of shank 210 as shown. Also, as shown in FIG. 4, the rotor motor components 342, 344, 346, 348 (as shown in FIG. 4) installed inside the turbine motor housing 230. The bearings 350 and deflector 332 are shown on drive shaft 240.

Shank

FIG. 5A is a front view of shank 210 of FIG. 3, FIG. 5B is a side view, and FIG. 5C is a cross-section view of FIG. 5B taken along A-A. Exhaust opening 502, 504, 506, and mounting holes 510, 512, 514, 516 are shown in FIG. 5A. Although three exhaust openings are shown, it is important to note that any number of exhaust openings may be used within the true scope of the present invention. In one example, mounting holes 512, 516 are threaded for accepting screws to mount the shank 210 to a live tooling station.

Also shown is a muffler pad bore 532 dimensioned to accept the muffler pad 316 and muffler screen 314.

Manifold and Gasket

FIG. 6A is a front view of gasket 318 between the shank of FIG. 5A and manifold of FIG. 7A and FIG. 6B is a side view of the gasket 318. Pressurized air enters air inlet 222 to drive the high-torque turbine motor assembly 340 and exits through the three openings 602, 604, 606 that correspond to exhaust openings 502, 504, 506 of shank 210. These exhaust openings 502, 504, 506 direct pressurized air from the air inlet 222 through a slot in a channel 710 in the manifold 220, as shown in FIG. 7A. This provides airflow to be connected between the air inlet 222 and the axial opening 242 of the drive shaft 240. In one embodiment, this gasket 318 can be made from rubber, nylon, or other materials are possible.

Turning now to FIG. 7A is a cross-section view of a manifold 220 with front side 760 and rear side 770. FIG. 7B is a top view of FIG. 7A. FIG. 7C is a front view, and FIG. 7D is a rear view of FIG. 7A. The exhaust holes 702, 704, 706 in one embodiment are drilled at an angle 703. In one embodiment, that angle 703 is between 5 and 15 degrees. In this embodiment, the angle is approximately 9.65 degrees offset of the centerline datum. The exhaust holes are formed to avoid cutting the threaded openings 730, 732, 734, 736, as shown in FIG. 7C, on the manifold 220 or the muffler pad bore 532 on the shank.

FIG. 7B shows a threaded opening 720 for the air inlet 222. The air inlet 222 is in fluid communications with the channel 710, through threaded opening 720, a slot 710 and axial opening 742, and threaded opening 740 as shown.

These exhaust holes 702, 704, 706 are in fluid communications with counterbore 744 as shown inside threaded opening 740 that accepts one end of the high-torque turbine motor assembly 340. The pressurized air flows through the axial opening 242 into the drive shaft 240. Bore 716 is set to receive seal 320, such as a press-fit seal and axial opening 242 of drive shaft 240 when assembled. Counterbore 744 includes a threaded opening 740 to rotatably mechanically couple with a threaded end of turbine motor housing 230.

FIG. 7D illustrates cavity 718 (also shown in FIG. 7A) that is shaped to corresponds to gasket 318. The gasket 318 helps to direct the pressurized air from the air inlet 222 through channel 710, and slot 720 to the axial opening 742. The gasket also has openings 602, 604, 606 that correspond to exhaust holes 702, 704, 706.

Figure 14C:
FIG. 14C is another side view, in accordance with an illustrative embodiment of the present invention.
Figure 14B:
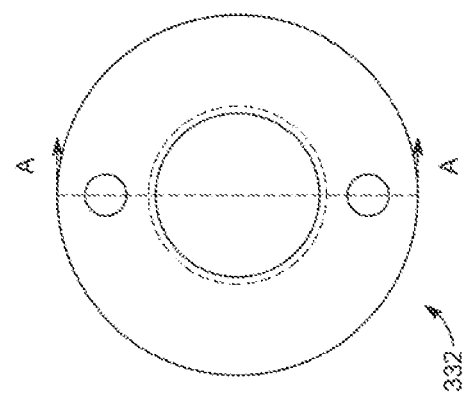
' and FIG. 14B is a front view thereof.
Figure 14A:
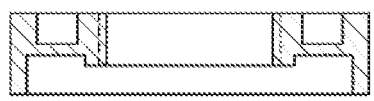
FIG. 14A is a cross-section view of the deflector of FIG. 14B, taken along A-A

FIG. 8A is a front view of a seal 320 for sealing airflow into the drive shaft 240 shown in FIG. 14 and FIG. 8B is a cross-section view of FIG. 8A taken along A-A'. The seal has an internal passage 824, as shown. In one embodiment, this seal can be made from nylon, rubber, but other materials are possible.

Turbine Motor Housing

FIG. 9A is a front view of turbine motor housing, and FIG. 9B is a cross-section view of FIG. 9A taken along A-A'. Shown in FIG. 9B are various internal bores 910, 912, 914, 916, 918 therethrough. More specifically, internal bore 910 is sized to accommodate rotor base 346 through end 940. Internal first bearing bore 912 is sized to accommodate one of the bearings 350 and bearing lock nut 348. Internal drive shaft bore 914 accepts an area of the drive shaft 240 between each of the bearings 350. Internal second bearing bore 916 is sized to receive the other of the two bearings 350. Internal deflector bore 918 is sized to accommodate deflector 332. Also shown is a threaded opening 740 for mating with the manifold 220.

Turbine Rotary Assembly

Figure 15:
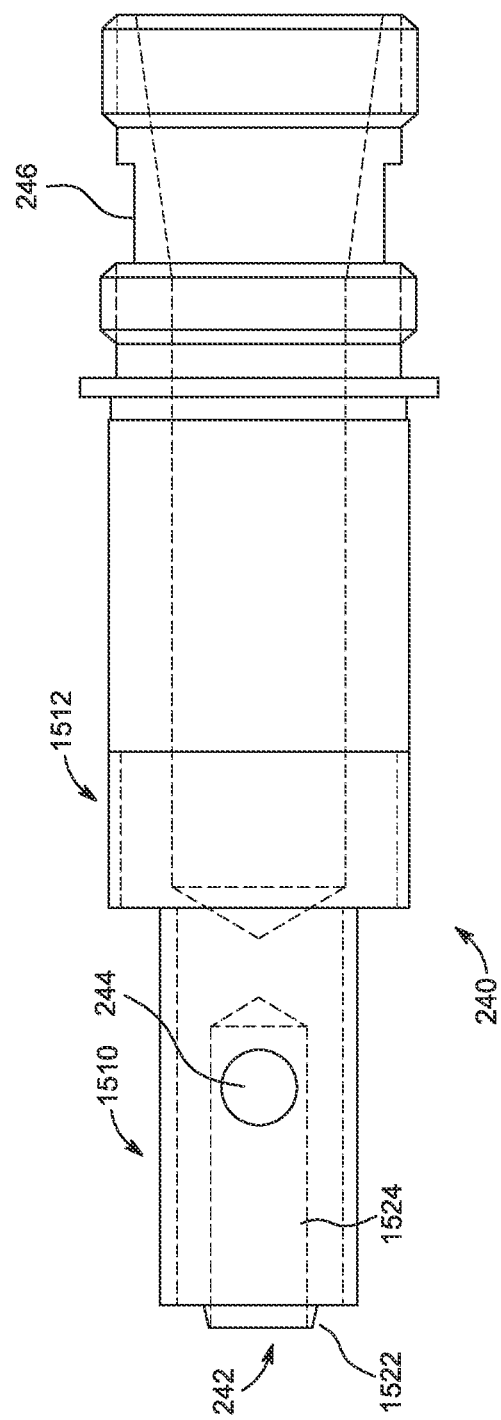
FIG. 15 is a side view of the drive shaft with an axial channel in fluid communications with a radial circular opening, in accordance with an illustrative embodiment of the present invention.

A high-torque turbine motor assembly 340 is mounted on a drive shaft 240. The high-torque turbine motor assembly 340 is generally described in the '752 patent and the '732 patent. The following is a brief overview of the operation. FIG. 10 through FIG. 14 illustrate the major internal components of the high-torque turbine motor assembly 340. FIG. 15 is the drive shaft 240.

Referring now to FIG. 10 through FIG. 15, the high-torque turbine motor assembly 340, specifically the rotor cap 342 (with opening 1256 to accommodate drive shaft 240 shown in FIG. 12A) and the turbine motor housing 230, each have a threaded wall 1010 and 1250 that receives and is fixedly attached to the threaded portion 1510 as shown in FIG. 15 of the drive shaft 240. The drive shaft 240 includes an axial channel 1524 and has an opening 244 that serves as inlets to the rotor body for high-pressure air that provides the motive force on the turbine motor housing 230 for turning the drive shaft.

The rotary base 346 has a plurality of tangential exhaust air passages 1244 strategically spaced to direct high-pressure internal air tangentially outwardly, resulting in torque on the rotor and, thus, the drive shaft 240. The opening 244 is typically formed in sets of two or more at various radial a position on the drive shaft 240. In this embodiment, there is another opening (not shown) formed on the backside of the drive shaft 240, i.e., 180 degrees from the opening 244. This set of two or more openings helps to maintain the balance of the drive shaft 240 and rotor. In addition to the use of thread walls 1010, 1250, other forms of attachment with the threaded portion 1510 of the drive shaft 240, both releasable and permanent, are contemplated, such as gluing, welding, or frictional engagement with the drive shaft 240. The top-end 1522 of the drive shaft 240 has an axial opening 242 that is in fluid communications with the opening 244.

The rotary base 346 has four radial portions 1202, 1204, 1206, 1208, proceeding from a narrow portion to a thicker portion, the thicker portion accommodating the four tangential exhaust air passages 1244 as shown. The housing tangential air exhaust passages are spaced approximately 90 degrees apart around the annular chamber 1220.

The turbine rotor body 346 has internal high-pressure air-receiving chambers formed by a rotor cap 342 and a rotor base 346. The high-torque turbine motor assembly 340 is generally cylindrical. The rotor cap 342 and a rotor base 346 fit together frictionally and are generally airtight. For example, the rotor cap 342 and a rotor base 346 are fit together by each being threaded along drive shaft 240. However, the rotor cap 342 and a rotor base 346 may also be glued together, press-fit together, or releasably or permanently attached by other, equivalent elements such as a metal clip.

The rotor base 346 in the preferred embodiment includes a governor in as described in the '752 patent and the '732 patent. Preferably, the governor comprises an annular chamber 1220.

A resilient or malleable valve ring or O-ring 1300 is shown in FIGS. 13A and 13B, typically made of rubber or plastic, are mounted in the annular chamber 1220 to regulate and restrict the airflow from the annular chamber 1220 to the tangential exhaust air passages 1244. Extending away from the resilient valve ring is an annular perforated barrier or rotor governor ring formed as a perforated barrier 344, as shown in FIG. 11. When high-pressure air (approximately 90 psi) is introduced into the high-torque turbine motor assembly 340, and the rotor speed reaches a predetermined number of revolutions per minute, the resilient valve ring O-ring 1300 deforms against the perforated barrier 344, thereby restricting airflow and decreasing the RPMs of the rotor. The range of speed for high-torque turbine motor assembly 340 may be modified. The hardness of the O-ring 1300 is changed to adjust the speed. The harder the O-ring 1300, produces faster speeds. Likewise, the softer the O-ring 1300, produces slower speeds. Further, the turbine rotor 310 may be slightly misaligned with the opening 244, resulting in lower speed. The set range of speed is "Fine-tuned" to a range using a combination of O-ring hardness and alignment to opening 244. For example, speeds in RPMs, such as, 40 k, 50 k, 60 k, 80 k, and other speeds, have been demonstrated.

The entire turbine motor spindle assembly 300 (except for the valve O-rings) may be made of rigid materials such as metal or plastic. The turbine rotor 310 bearings do not need lubrication.

As the name suggests, self-lubricating bearings provide their own lubrication during operation without requiring the application of grease or oil lubricants. Self-lubricating bearings are also referred to as maintenance-free or greaseless bearings as they require no relubrication or grease. An important distinction to make is that self-lubricating bearings are not bearings that come pre-applied with grease or oil lubricant—these bearings are instead referred to as prelubricated or grease-packed bearings. Grease-packed bearings require relubrication at some point in their service life or, more typically, are replaced with new bearings Self-lubricating bearings work by having lubricant impregnated within the sliding layer of the bearing. This lubricant can either be liquid (oil) or solid (graphite, MoS2, lead) based on the requirements of the application (such as operating temperature). As the bearing operates, the lubricant is released through pores in the sliding layer, lubricating the bearing surface. The lubricant is uniformly dispersed throughout the sliding layer, and thus, there is no reduction in low friction bearing performance, even if the sliding layer becomes worn. A "running-in" surface is also usually included at the top of the sliding layer to provide a low-friction bearing performance at start-up before the impregnated lubricant reaches the bearing surface.

The perforated barrier 344 may be made of plastic, metal, or other suitable material. Also, the perforated barriers 344 may be formed intrinsically with the inner wall of FIG. 12 or releasably or permanently attached thereto. The perforated barrier 344 may be a fence-like structure, as illustrated in FIG. 10. However, equivalent structures are also contemplated.

Shaft

FIG. 15 is a side view of the drive shaft 240 with an axial channel 1524 in fluid communications with opening 244. It is important to note that there can be more than one opening 244 or opening of different sizes. Also shown are details 1522 of the axial opening 244, a portion 1510 upon which the high-torque motor components 342, 346, 348 are mechanically coupled, and a bearing surface 1512 for receiving inner races of bearings 350. The rotor components 342, 346, 348 can be mechanically coupled to the drive shaft 240 using threaded wall 1010 that corresponds to threads (as described above) on the drive shaft 240.

The present invention provides less weight, vibration, chatter, generates less heat, is self-lubricating, and produces less noise as compared to other commercially available rotors.

Non-Limiting Examples

The instant invention has been shown and described herein in what is considered to be the most practical and preferred embodiment. It is recognized, however, that departures may be made therefrom within the scope of the invention and that obvious modifications will occur to a person skilled in the art.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A turbine motor spindle assembly for use with a multitasking machine, comprising:
a manifold with a front end and a rear end, the manifold includes at least one air intake passage that receives pressurized air that is directed axially through a bore to rotatably couple with a drive shaft, the pressurized air drives at least one turbine motor assembly and the drive shaft, the drive shaft is mounted inside a turbine motor housing, the at least one turbine motor assembly includes one or more tangential openings that expel exhaust air therefrom;
the turbine motor housing is mechanically coupled to the front end of the manifold with an exhaust air passage that directs the exhaust air from the one or more tangential openings out through the rear end of the manifold; and
a shank with a front end and a read end, the front end of the shank attached to the rear end of the manifold and the rear end of the shank includes at least one exhaust air passage that directs the exhaust air from the rear end of the manifold out the rear end of the shank.

2. The turbine motor spindle assembly of claim 1, wherein an overall length of the manifold, the turbine motor housing, and the drive shaft when assembled together is less than 2 inches.

3. The turbine motor spindle assembly of claim 1, wherein an overall length of the shank, the manifold, the turbine motor housing, and the drive shaft are less than 2 inches in length when assembled together.

4. A turbine motor spindle assembly, comprising:
a drive shaft with a first end and a second end and an outer wall, the first end including an axial bore and a set of openings in the outer wall at a position from the first end, the axial bore in fluid communications with the set of openings, the drive shaft including at least one bearing surface which mates with a first inner ring of a first drive shaft bearing and a second inner ring of a second drive shaft bearing;

a turbine motor housing with a first axial end and a second axial end, at least three internal bores formed along an axial direction between the first axial end to the second axial end, including
- a first internal bore of a first diameter size to accept a first outer ring of the first drive shaft bearing,
- a second internal bore of a second diameter size to accept a second outer ring of the second drive shaft bearing, and
- a third internal bore of a third diameter size to accept a turbine motor assembly thereinto, the turbine motor assembly with at least one turbine in fluid communication with the set of openings of the drive shaft and the turbine motor assembly including one or more tangential openings for expelling air from the at least one turbine; and a manifold with a second end coupled with the second axial end of the turbine motor housing and a first end coupled with a shank, the manifold includes a fluid inlet in fluid communication with the axial bore of the drive shaft to drive the turbine motor assembly and at least one axial opening in fluid communication with the one or more tangential openings of the turbine motor assembly for air being expelled therefrom.

5. The turbine motor spindle assembly of claim 4, wherein the first internal bore of the first diameter and the second internal bore of the second diameter are identical.

6. The turbine motor spindle assembly of claim 5, wherein the third diameter is larger than the first diameter and the second diameter, respectively.

7. The turbine motor spindle assembly of claim 5, wherein the second end of the manifold includes an internal bore of the third diameter size to accept a portion of the turbine motor assembly thereinto.

8. The turbine motor spindle assembly of claim 4, wherein the at least one axial opening of the manifold is formed at an angle with respect to the drive shaft.

9. The turbine motor spindle assembly of claim 8, wherein the angle is between 5 and 15 degrees.

10. The turbine motor spindle assembly of claim 8, wherein the angle is between 9 and 10 degrees.

11. The turbine motor spindle assembly of claim 8, wherein the angle is between 9.5 and 10 degrees.

12. The turbine motor spindle assembly of claim 4, wherein a combined overall length of the manifold, the turbine motor housing, the drive shaft, and a collet nut is no more than 1.76 inches in length when assembled together.

13. A machining system comprising:
- a turbine motor spindle assembly;
- a live tooling machine or multitasking machine;
- the turbine motor spindle assembly including
  - a drive shaft with a first end and a second end and an outer wall, the first end including an axial bore and a set of openings in the outer wall at a position from the first end, the axial bore in fluid communications with the set of openings, the drive shaft including at least one bearing surface which mates with a first inner ring of a first drive shaft bearing and a second inner ring of a second drive shaft bearing;
  - a turbine motor housing with a first axial end and a second axial end, at least three internal bores formed along an axial direction between the first axial end to the second axial end, including
    - a first internal bore of a first diameter size to accept a first outer ring of the first drive shaft bearing,
    - a second internal bore of a second diameter size to accept a second outer ring of the second drive shaft bearing, and
    - a third internal bore of a third diameter size to accept a turbine motor assembly thereinto, the turbine motor assembly with at least one turbine in fluid communication with the set of openings of the drive shaft and the turbine motor assembly including one or more tangential openings that expels exhaust air from the at least one turbine; and
  - a manifold with a second end coupled with the second axial end of the turbine motor housing and a first end coupled with a shank, the manifold includes a fluid inlet in fluid communication with the axial bore of the drive shaft to drive the turbine motor assembly and at least one axial opening in fluid communication with the one or more tangential openings of the turbine motor assembly for air being expelled therefrom.

14. The turbine motor spindle assembly of claim 13, wherein the first internal bore of the first diameter and the second internal bore of the second diameter are identical.

15. The turbine motor spindle assembly of claim 14, wherein the third diameter is larger than the first diameter and the second diameter, respectively.

16. The turbine motor spindle assembly of claim 14, wherein the second end of the manifold includes an internal bore of the third diameter size to accept a portion of the turbine motor assembly thereinto.

17. The turbine motor spindle assembly of claim 13, wherein the at least one axial opening of the manifold is formed at an angle with respect to the drive shaft.

18. The turbine motor spindle assembly of claim 17, wherein the angle is between 5 and 15 degrees.

19. The turbine motor spindle assembly of claim 13, wherein a combined overall length of the manifold and the turbine motor housing and the drive shaft and a collet nut, when assembled together, is no more than 1.76 inches in length.

\* \* \* \* \*